E. J. MURPHY.
ELECTROMAGNETIC CLUTCH AND REVERSING MECHANISM.
APPLICATION FILED JAN. 15, 1920.

1,424,027.

Patented July 25, 1922.

Inventor:
Edwin J. Murphy,
by Albert G. Davis
His Attorney.

UNITED STATES PATENT OFFICE.

EDWIN J. MURPHY, OF SCHENECTADY, NEW YORK, ASSIGNOR TO GENERAL ELECTRIC COMPANY, A CORPORATION OF NEW YORK.

ELECTROMAGNETIC CLUTCH AND REVERSING MECHANISM.

1,424,027. Specification of Letters Patent. Patented July 25, 1922.

Application filed January 15, 1920. Serial No. 351,587.

*To all whom it may concern:*

Be it known that I, EDWIN J. MURPHY, a citizen of the United States, residing at Schenectady, in the county of Schenectady, State of New York, have invented certain new and useful Improvements in Electromagnetic Clutch and Reversing Mechanism, of which the following is a specification.

My invention has reference to electromagnetic gear clutching and reversing mechanism by means of which a driving shaft rotating in one direction may transmit motion to a driven shaft either in one given direction or in a reverse direction, according to the energization of one or the other of two electromagnets. The gears may be of any known type, either provided with cogs or knurls, or with smooth or rough friction surfaces, but in either case the driving engagement is caused by magnetic attraction; it is therefore practically instantaneous and may be made as powerful as desired. In the accompanying drawing, which forms a part of this specification, one of the many forms which my invention may assume is illustrated as follows:

Figure 1:
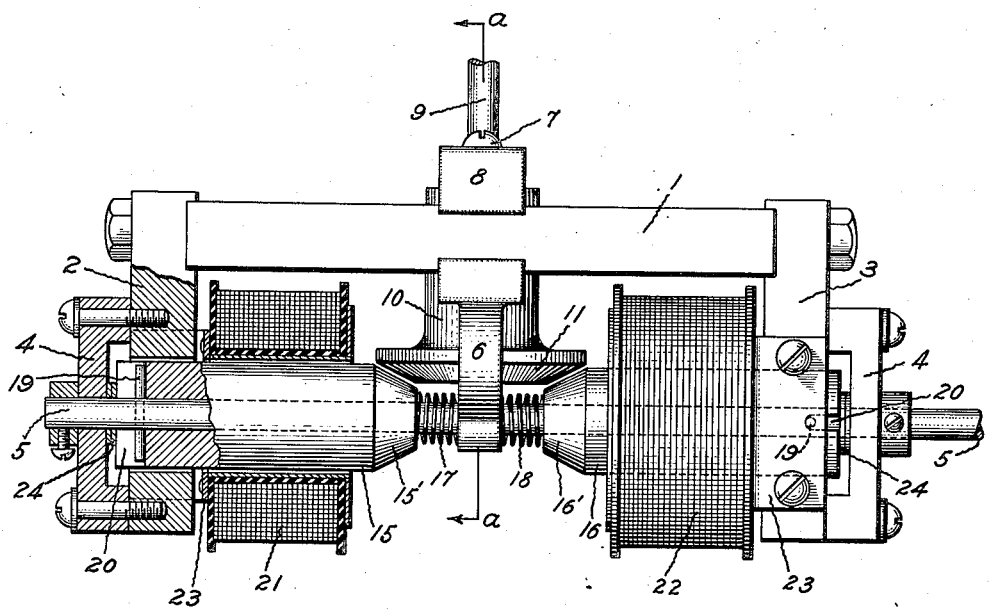
Fig. 1 is a front elevation, partly in section.
Figure 2:
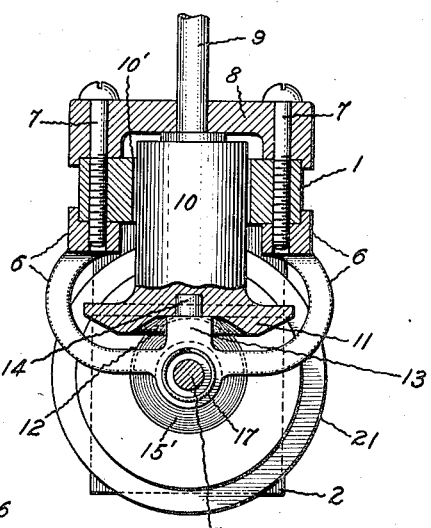
Fig. 2 is a central section along line *a a*, looking in the direction indicated by arrows.

A U-shaped magnetic frame 1, has to each of its legs 2, 3, secured a bracket 4, and the driving shaft 5, is journaled in these brackets; an intermediate bearing for the driving shaft is provided by the double curved bracket 6 which is secured to the magnetic frame 1, by screw bolts 7, 7. The same screw bolts also secure the bracket 8 to the magnetic frame 1, and this bracket serves as a bearing for the driven shaft 9. To the shaft 9 is secured the cylindrical central shank 10, of a miter gear 11, made of magnetic material, iron or mild steel, which in the drawing is shown with a smooth working face, but it should be understood that the working face of this miter gear might be formed with a rough face, or with knurls or with cogs. The under surface of the miter gear is formed with a cavity 12, and with a central bearing. A lug 13, extending from the middle portion of bracket 6 extends into the cavity 12, and an axial pin 14, rising from the lug 13 is received in the bearing formed in the bottom of the cavity. The central shank 10 of the miter gear passes freely through an opening 10′ formed in the central portion of the magnetic frame 1; the miter gear together with the driven shaft 9, is thus journaled at two points, but the shank 10 makes no contact with the frame 1.

On each side of the central bearing of the driving shaft there is loosely mounted on the shaft a cylinder of magnetic material; these cylinders are marked in the drawing by the numerals 15 and 16, respectively, and the end of each cylinder which projects toward the miter gear 11, is also shaped into a miter gear, the working surfaces 15′, 16′ of which have the same slope and configuration as the working surface of the miter gear 11. Between the bracket 6 and the miter gears 15′ and 16′ are the helical springs 17, 18, surrounding the driving shaft, and these springs tend to push the cylinders 15, 16 rearwardly on the driving shaft, so that normally neither of the miter gears 15′ and 16′ engages the miter gear 11. While the cylinders 15, 16 are loose on the driving shaft so as to be capable of longitudinal movement thereon, each of these cylinders is keyed or splined to the shaft so as to rotate with the latter; the keys are simple pins 19, secured at right angles to the shaft and projecting into diametrical slots 20, in the rear end of each cylinder. Each cylinder passes freely through one of the legs 2, 3, respectively, of the magnetic frame 1, without contact with the same.

Encircling each cylinder 15 and 16, is a magnet coil 21, 22, respectively, each securely fastened to a leg of the magnetic frame by an angular plate 23, and the inner face of each coil is or may be lined with brass or other non-magnetic material, as indicated by shading; the cylinders are not in contact with the lining. Spacing washers 24, are interposed between the rear ends of the cylinders and the brackets 4, by which the rearward movement of the cylinders under the action of the springs 17, 18 is limited, the limit being such that the working faces of miter gears 15′, 16′, are only a short distance from contact with the working face of miter gear 11. It should be understood that with the exception of the frame 1 with its legs 2, 3, the miter gear 11 with its shank 10 and the miter gears 15′, 16′ including the cylinders 15, 16, all other parts of the structure are made of non-magnetic material.

The operation of the apparatus is as follows:

When neither of the magnet coils is energized, the parts are in the condition shown in Fig. 1; that is to say, the driving shaft, though continuously rotating, does not actuate the driven shaft. When one of the magnet coils, say coil 21, is energized by the passage of an electric current, its core, the cylinder 15, is magnetized and a local magnetic circuit is formed, comprising the cylinder 15 with its miter gear face 15′, the permanent air gap between cylinder 15 and leg 2, the leg 2 itself, one half of the horizontal bar of frame 1, the permanent air gap between the frame and shank 10, the shank 10 itself with its miter face 11, and the variable air gap between miter gears 11 and 15′. It will be observed that the only element in this magnetic circuit that is movable in the direction of the magnetic flux is the cylinder 15, this cylinder will, therefore, move against the tension of spring 17, longitudinally until the miter gear face 15′ makes forcible contact with miter gear face 11, closing the gap at this place. The working faces of gears 11 and 15′ are thus clutched together by direct magnetic attraction, but each is free to rotate, that is to say at right angles to the flux. The gear 11 with the driven shaft 9 will now be rotated in a certain direction with a speed depending upon the ratio of the diameters of the two gears, in the example shown in the drawing the driven shaft will rotate at a lower speed than the driving shaft. The engagement of the gears is practically instantaneous with the closure of the magnetizing coil circuit and other things being equal, the force of the clutching engagement and the torque imparted to the driven shaft is a function of the current employed.

It should be noted that owing to the small magnetic reluctances at the permanent air gaps between the elements of the local magnetic circuit here under consideration, only a very faint leakage flux can pass to the other side of the apparatus; it is indeed so faint that no perceptible movement is imparted to miter gear 16′. This is due not only to the small permanent air gaps, but also, and in a high degree, to the massive elements which constitute the local magnetic circuit, which, in effect, is a local magnetic short-circuit. If the circuit to coil 21 is broken, all magnetizing effect ceases and spring 17 returns the miter gear 15′ to its original position and the driven shaft becomes again inactive. If now the magnet coil 22 is energized, the identical operation which has been described with reference to coil 21, takes place on the other side of the apparatus where a new local magnetic short-circuit is established and the driven shaft is being rotated in a reverse direction; it is not deemed necessary to follow this up in detail, since it would only be a repetition of what has been said with reference to coil 21. While the springs 17, 18 assist the disengagement of the gears upon cessation of current through coils 21, 22, these springs are not absolutely necessary.

Figure 3:
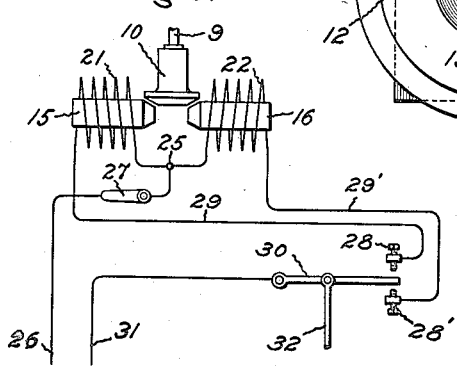
Fig. 3 is a diagram of circuit connections for selectively energizing one or the other of the two electromagnets.

The means for controlling the circuits to the two magnet coils may be any kind of reversing switch, and the same may be actuated manually at the will of an operator or automatically in response to any condition of an apparatus or system that may require that the driven shaft be either not rotated or that it be rotated in one or the other direction. In Fig. 3 one such reversing switch is indicated by way of example.

The magnet coils 21, 22 are here shown connected in series, and an intermediate point 25 of this connection is tapped to one of the main supply lines 26; a simple switch 27 may be placed in this connection. The free terminal of coil 21 is connected to contact 28 by conductor 29, while the free terminal of coil 22 is connected with contact 28′ by conductor 29′. Between these two contacts extends the switch lever 30, which is connected with the other supply line 31. A link 32, connected with the switch lever 30 may be operated by hand at the will of an attendant or may be actuated automatically in response to varying conditions of operation of a mechanical system of which the driven shaft 9 is an element. There may be a condition of operation of that system which requires that the shaft 9 be not rotated, and in that event the attendant or the automatic means will keep the switch lever 30 in the position shown in the drawing, out of engagement with both contacts 28, 28′. Another condition of operation of the system may require that the shaft 9 be rotated either clockwise or counter-clockwise, and in that event either the attendant or the automatic means will selectively turn the switch lever to bear upon one or the other of the two contacts 28, 28′, thereby energizing either coil 21 or coil 22, as required; the circuit connections are so clear that the course of current in either case need not be pointed out.

It is, of course evident that there is no theoretical and barely a practical limit of distance between the reversing switch and the magnetic clutch gear which may be effectively controlled by the former.

While the invention has been explained in detail with reference to a specific structure which in practice has been used with perfect success, it is evident that numerous changes may be made without deviating from the principle of the invention.

What I claim as new and desire to secure by Letters Patent of the United States, is:

1. An electro-magnetic gear clutch and reversing mechanism, comprising a driving shaft, two gears of magnetic material splined to the shaft so as to be capable of moving independently lengthwise of the same, a driven shaft supporting a gear of magnetic material in proximity to the driving shaft gears, springs for holding the latter gears normally out of engagement with the driven shaft gear, and means for establishing selectively a local magnetic short-circuit including either of the driving shaft gears and the driven shaft gear.

2. An electro-magnetic gear clutch and reversing mechanism comprising a driving shaft, two gears of magnetic material splined to the shaft so as to be capable of independent lengthwise movement thereon, a driven shaft supporting a gear of magnetic material in proximity to the driving shaft gears, springs tending to hold the latter gears out of engagement with the driven shaft gear, two independent local magnetic short circuits each including a driving shaft gear and the driven shaft gear, and means for selectively energizing either of the circuits.

3. An electro-magnetic gear clutch and reversing mechanism comprising two independent local magnetic short circuits each including a separate magnetic driving gear capable of independent axial movement and a magnetic driven gear common to both circuits and in position to receive the working contact of the driving gears on diametrically opposite points, and means for energizing selectively either of the two circuits.

4. In an electro-magnetic gear clutch and reversing mechanism, the combination with a frame of magnetic material, two driving miter gears of magnetic material loosely passing through the frame in axial alignment, with their working surfaces facing each other and each capable of independent axial movement; of an intermediate driven miter gear of magnetic material loosely passing through the frame in operative proximity and between the driving gears but normally out of contact with both, and means for selectively magnetizing either of the driving gears.

In witness whereof, I have hereunto set my hand this 14th day of January, 1920.

EDWIN J. MURPHY.